April 18, 1950     A. A. RAJAN     2,504,729
PARKING BRAKE FOR VEHICLES
Filed June 7, 1946     2 Sheets—Sheet 1
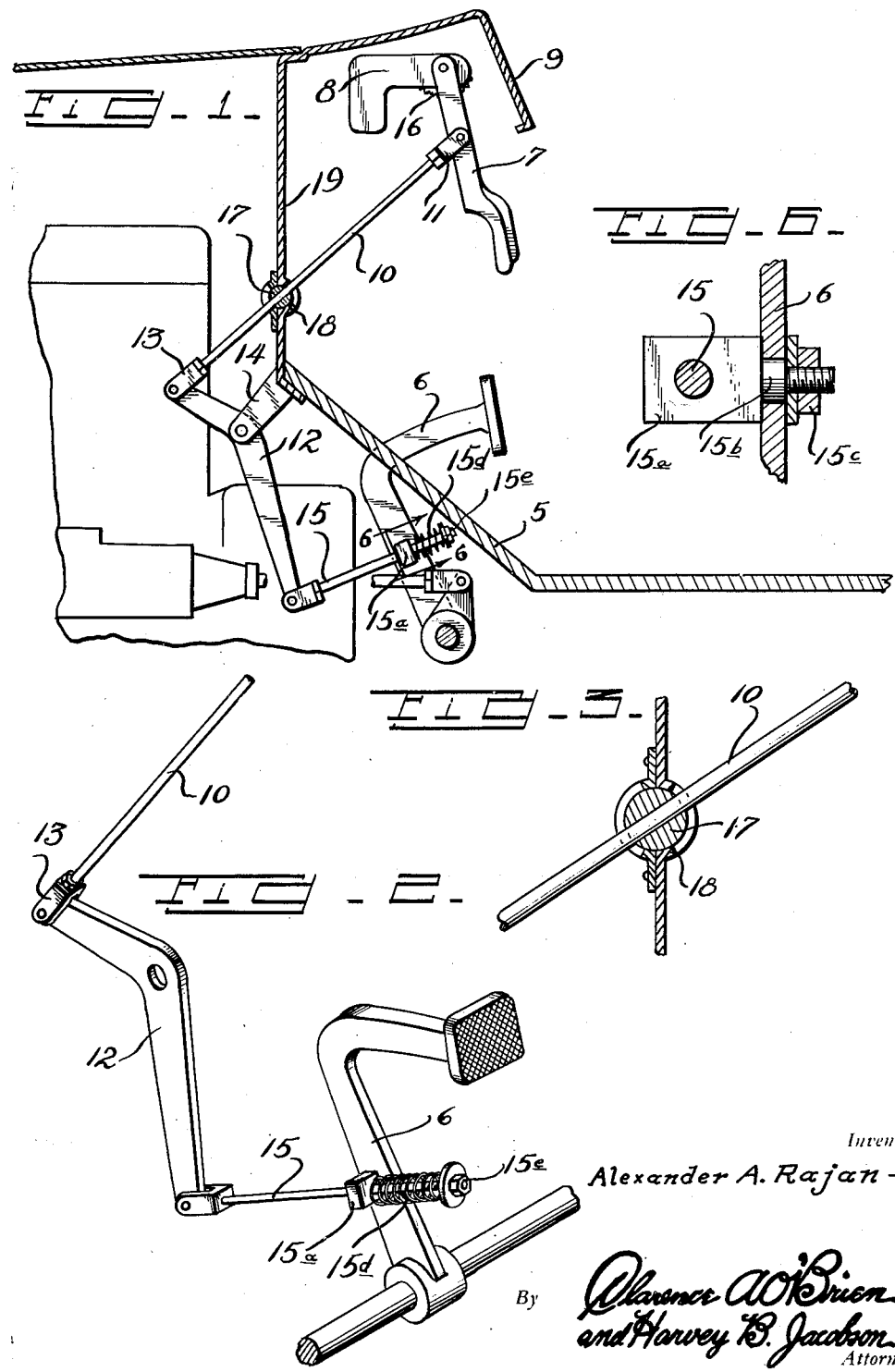
Inventor
Alexander A. Rajan
By Clarence A. O'Brien
and Harvey B. Jacobson
Attorneys April 18, 1950  A. A. RAJAN  2,504,729
PARKING BRAKE FOR VEHICLES
Filed June 7, 1946  2 Sheets-Sheet 2
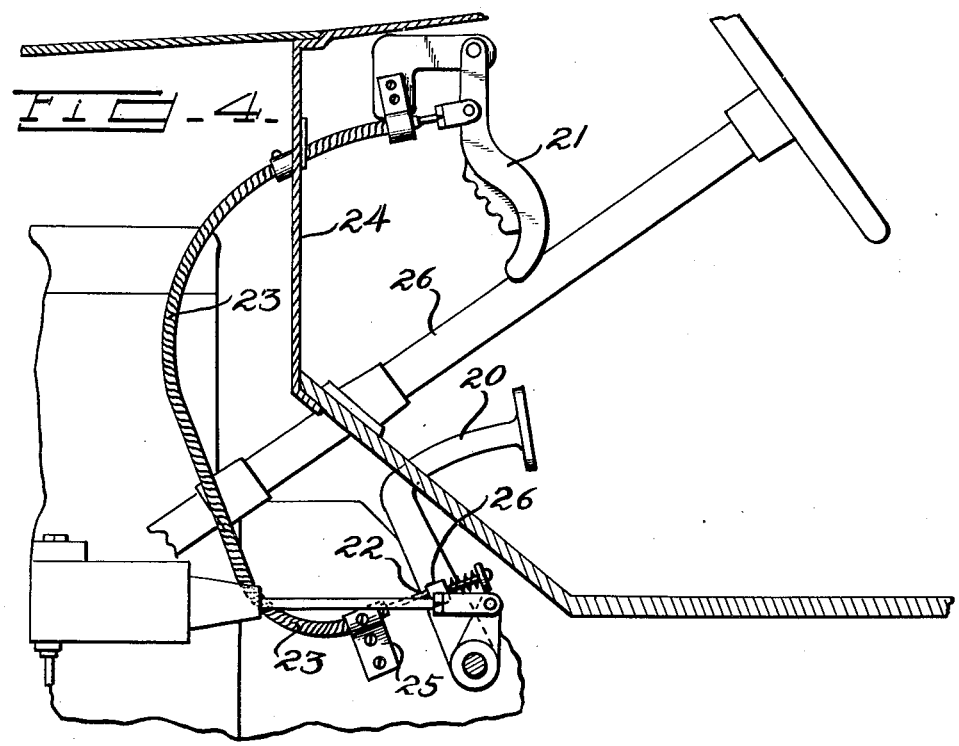
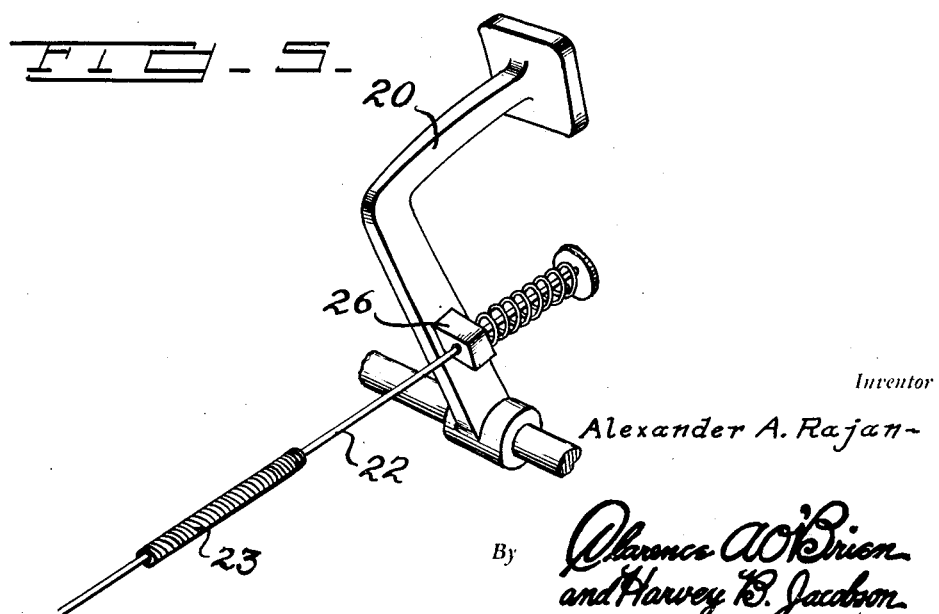
Inventor
Alexander A. Rajan
By Clarence A. O'Brien
and Harvey B. Jacobson
Attorneys

Patented Apr. 18, 1950

2,504,729

UNITED STATES PATENT OFFICE 2,504,729

PARKING BRAKE FOR VEHICLES

Alexander A. Rajan, San Francisco, Calif.

Application June 7, 1946, Serial No. 675,032

1 Claim. (Cl. 74—481)

The present invention relates to new and useful improvements in brakes for vehicles and more particularly to means for utilizing the foot brake of a four wheel hydraulic brake system for securing the brakes in applied position while the vehicle is idle.

More specifically, the invention embodies the provision of a hand brake lever operatively connected to the foot brake pedal and arranged to secure the foot brake pedal in its depressed or brake applying position so that the usual four wheel brakes of an hydraulic brake system may be utilized also as a parking brake.

An important object of the present invention is to provide a parking brake for vehicles whereby the separate hand operated brake system used as an emergency or parking brake may be eliminated.

A further object of the invention is to provide a combined hand and foot brake mechanism for the four wheel brakes of a hydraulic brake system arranged for independent brake applying or releasing movements and which may be mounted in position on the vehicle without necessitating any material changes or alterations in the construction thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view of the combined hand and foot brake mechanism with parts of the vehicle broken away and shown in section.

Figure 2 is an enlarged fragmentary perspective view of the bell crank lever connected to the foot pedal.

Figure 3 is an enlarged sectional view of the ball and socket mounting for the brake rod of the hand lever.

Figure 4 is a side elevational view of a modified connection between the hand lever and foot pedal and with parts shown in section.

Figure 5 is an enlarged perspective view of the connection between the flexible cable and the foot pedal forming part of the modified construction, and Figure 6 is a fragmentary sectional view taken on a line 6—6 of Figure 1.

Referring now to the drawings in detail and first with respect to the form of invention illustrated in Figures 1 to 3 inclusive, the numeral 5 designates the floor board of an automobile or other motor driven vehicle and the numeral 6 designates the brake pedal which works through the floor board for operating the conventional hydraulic brake system of the vehicle.

The brake pedal 6 is employed for applying the brakes by a depressing action of the pedal and the pedal may also be depressed by means of a hand lever 7 pivoted to a bracket 8 under the instrument panel 9 of the vehicle and to which one end of a brake rod 10 is pivotally attached by means of a clevis 11.

The other end of the brake rod 10 is pivotally attached to the upper end of a bell crank lever 12 by means of a clevis 13, the bell crank lever being pivoted to the underside of the floor board 5 by means of a bracket 14. The lower end of the bell crank lever 12 is connected to the brake pedal 6 by means of a link 15 slidably mounted in an apertured guide plate 15a pivoted at one side of the brake pedal by means of a pin 15b extending transversely through the pedal and secured thereto by a nut 15c. A coil spring 15d is secured on the link 15 to bear against the rear of the plate 15a to yieldably connect the hand lever 7 to the brake pedal and to permit depressing of the foot pedal without affecting the hand lever.

In the operation of the device a rearward movement of the hand lever 7 will cause a rearward movement of the upper end of the bell crank lever 12 and a forward movement of the lower end thereof whereby to pull the brake pedal 6 forwardly and downwardly into its brake applying position.

The hand lever 7 is secured in its brake applying position by means of a conventional form of ratcheting mechanism 16.

The brake rod 10 is slidably mounted transversely through a ball 17 which is swivelly supported in a socket 18 mounted in the firewall 19 of the hood of the vehicle.

Accordingly, it will be apparent that either the foot pedal 6 or the hand lever 7 may be utilized for applying the brake of the vehicle.

In the form of invention illustrated in Figures 4 and 5 of the drawings, the foot pedal 20 and hand lever 21 are connected to each other by means of a flexible cable or rod 22 working in a flexible metal housing 23 supported by the fire wall 24 and also by a clamp 25 attached to a part of the engine.

In this form of the invention the brakes are likewise applied either by a rearward pulling action on the hand lever 21 or by a depressing action of the foot pedal 20, the flexible cable 22 connecting the foot pedal to the hand lever in a manner to produce the desired depressing action of the pedal. The lower end of the cable 22 also slides through the apertured plate 26 carried by the foot pedal 20 as heretofore explained.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having thus described the invention, what is claimed as new is:

A vehicle brake operating mechanism comprising in combination, a foot pedal, a hand lever, and means connecting the pedal and lever to each other for applying the brake upon the actuation of either the pedal or lever, said means comprising a bell crank lever, a pivotal support for the intermediate portion of the bell crank lever, a rod connected to one end of the bell crank lever, said rod being yieldingly and slidably connected to the foot pedal to permit operation of said foot pedal independently of said hand lever, a rod connecting the other end of the bell crank lever to the hand lever, and a swivel support for the intermediate portion of said last-named rod.

ALEXANDER A. RAJAN.

REFERENCES CITED

The following references are of record in the file of this patent:

UNITED STATES PATENTS

| Number | Name | Date |
| --- | --- | --- |
| 1,275,706 | Langolf | Aug. 13, 1918 |
| 1,353,379 | Caufield | Sept. 21, 1920 |
| 1,440,296 | Hokamp | Dec. 26, 1922 |
| 1,482,973 | Cramer | Feb. 5, 1924 |
| 1,509,919 | Amend | Sept. 30, 1924 |
| 1,540,261 | Farmer | June 2, 1925 |
| 1,582,934 | Palmgreen | Apr. 7, 1925 |
| 1,715,997 | Fekete | June 4, 1929 |
| 2,030,753 | McDonnell | Feb. 11, 1936 |
| 2,154,929 | Edwards | Apr. 18, 1939 |
| 2,175,188 | Fuller | Oct. 10, 1939 |
| 2,309,454 | Heller | Jan. 26, 1943 |
| 2,322,499 | Andrews | June 22, 1943 |
| 2,399,150 | Snider | Apr. 23, 1946 |

FOREIGN PATENTS

| Number | Country | Date |
| --- | --- | --- |
| 546,057 | France | Oct. 27, 1922 |